United States Patent [19]

Vescial

[11] Patent Number: 4,514,087
[45] Date of Patent: Apr. 30, 1985

[54] RING LASER GYROSCOPE READOUT FOR PARTIALLY OVERLAPPING BEAMS

[75] Inventor: Frederick Vescial, Orange, Calif.

[73] Assignee: Rockwell International Corporation, El Segundo, Calif.

[21] Appl. No.: 410,790

[22] Filed: Aug. 23, 1982

[51] Int. Cl.$^3$ ............................................. G01C 19/64
[52] U.S. Cl. ................................................... 356/350
[58] Field of Search ........................................ 356/350

[56] References Cited

U.S. PATENT DOCUMENTS 3,879,130  4/1975  Greenstein ......................... 356/350

Primary Examiner—Vincent P. McGraw
Attorney, Agent, or Firm—Gilbert H. Friedman; H. Fredrick Hamann

[57] ABSTRACT

A ring laser gyroscope includes a laser ring having at least three reflective surfaces. At least one of the reflective surfaces is partially reflecting and partially transmissive for removing a portion of the laser light within the ring, and for directing the removed light onto an output detector. Optical elements are provided for displacing the light directed on the output detector in a fashion by which a portion of the light from one of the counter rotating beams only partially overlaps the light from the other beam. A detector is provided for detecting the intensity of each of the counter rotating beams from the nonoverlapping beam portions on the detector and for detecting the fringe motion of the interfacing beams produced by the overlapping portions of the beams on the detector.

In another aspect, a detector is provided for detecting the intensity and frequency differences of the counter rotating beams in which two intensity producing detectors are provided spaced apart by a distance corresponding approximately to the overlapping portions of the counter rotating light beams upon the detector, whereby the overlapping portions of the beams fall generally between the two detectors. A plurality of detector stripes are provided between the two intensity detectors, whereby stripes of the interference patterns move across the detector stripes to provide an indication of the frequency difference between the counter rotating beams and sense of rotational input.

18 Claims, 10 Drawing Figures

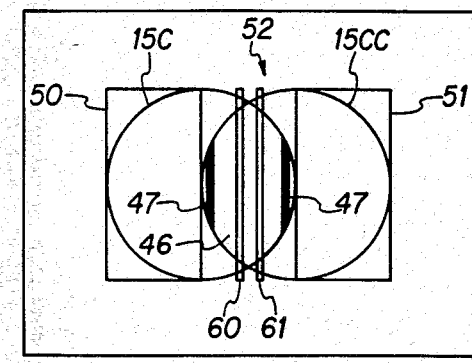
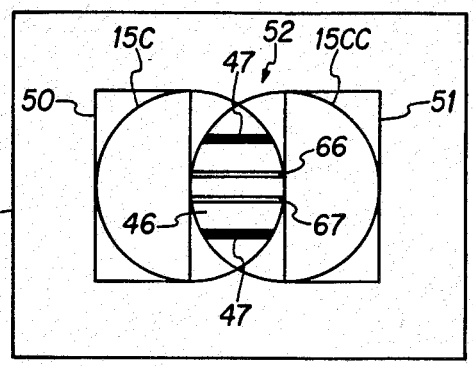
FIG. 5a  FIG. 5b
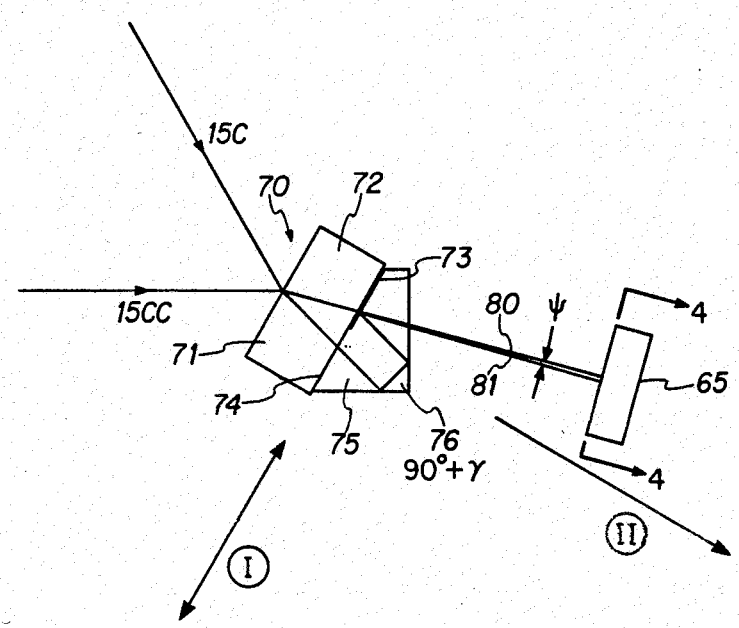
FIG. 6

RING LASER GYROSCOPE READOUT FOR PARTIALLY OVERLAPPING BEAMS

BACKGROUND OF THE INVENTION

1. Field of the Invention

This invention relates to improvements in ring laser gyroscopes and means for detecting an output therefrom.

2. Brief Description of the Prior Art

Laser gyroscopes are unconventional gyroscopes, as they do not contain a spinning mass, unlike the "spinning mass" gyroscopes of the prior art. In operation, a closed laser ring type cavity is established which supports independent oppositely directed traveling waves, each of which can oscillate at different frequencies. Each counter rotating beam frequency is dependent upon rotation of the cavity with respect to inertial space. The frequency difference between the counter rotating beams is a direct measure of the cavity rotation rate. Ordinarily, the output frequency difference is detected by superimposing one of the counter rotating beams onto the other to establish an interference pattern which moves at a rate equal to the frequency difference.

One optics-detector arrangement of the prior art is taught by D. M. Thymian and T. J. Podgorski, ASTIA Document AD 527867, GG1300AD01, Laser Gyro Final Report, May, 1973, pp. 7–8. A similar typical ring laser gyroscope embodiment is represented in the drawing of FIG. 1. The gyroscope 10 is fabricated about a closed triangular ring defined by reflective mirror elements 11, 12, and 13. Counter rotating light beams, denoted by the reference numerals 15C and 15CC travel around the ring in clockwise and counter clockwise directions, respectively. Typically, a lasing medium (not shown) is included within the cavity to support the counter rotating beams 15C and 15CC.

The output from the ring laser gyroscope is derived at two of its corners, part of the output being derived at the reflective surface 12, the other at reflective surface 13. With respect first to the output at reflective surface 13, the surface 13 is designed to be partially reflective and partially transmissive to the light impinging on it. Thus, the light 15C traveling in a clockwise direction, in addition to being reflected onto the reflective surface 11, is partially transmitted through the reflective surface 13 to follow a path generally indicated by the reference numeral 17 to impinge upon a detector 20. In a similar fashion, the light beam 15CC traveling in a counter clockwise direction is partially reflected from the surface 13 to impinge upon the reflective surface 12, and is partially transmitted through the reflective surface 13 to follow a path 18 to impinge upon a detector 21. The detectors 20 and 21 are intensity detectors, each of which produces an output which may be summed with the other to produce an overall loop or cavity intensity indication. (In some cases, it may also be advantageous to have the single beam intensity signals available also.) Because the intensity of the beams is dependent upon the length of the ring, typically at least one of the reflective surfaces 11, 12, or 13 is constructed to be adjustably movable in response to an intensity signal, such as is developed by the detectors 20 and 21 (moving means not shown). Thus, the length of the ring is dynamically tuned in accordance with the intensity of the light indicated by the output of the detectors 20 and 21.

In addition to the foregoing, ring laser gyroscopes of the prior art usually include a means for measuring the frequency difference between the clockwise and counter clockwise rotating beams. In the embodiment shown in FIG. 1, this means is provided at the corner reflector 12, and is constructed at follows. The corner reflector 12 has a partially reflective and partially transmissive coating 12A deposited on one of its faces. Thus, a portion of each of the clockwise and counter clockwise light beams incident upon the surface 12A is reflected onto the mirrors 13 and 11, respectively. In addition, a portion of each of the incident counter clockwise and clockwise light beams is transmitted through the reflective surface 12A to impinge respectively on a corner reflector 24 and a detector 25, as presently described. (It should be noted that if desired the locations of the corner reflector 24 and the detector 25 may be reversed from the positions presently to be described without adversely affecting the performance of the circuit.) More specifically, the transmitted portion of the clockwise rotating beam 15C follows a path 30 through the substrate 12B to impinge onto the detector element 25. The transmitted portion of the counter clockwise rotating beam 15CC follows a path 31 through the substrate 12B to be reflected by the corner reflector 24 back onto the back side of the substrate 12B. The back side of the substrate 12B is also coated with a 50-50 beamsplitter coating 26 (the beam splitting coating 26 covering approximately half of the substrate surface, as indicated) to reflect the light incident upon the surface 26 from the corner reflector 24 to impinge on the detector 25. The pattern of the light reflected from the beam splitting coating 26 is superimposed upon the pattern produced by the clockwise rotating beam 15C on the face of the detector 25. The superposition of the two beams produces an interference pattern by which the frequency difference of the two beams can be determined. One example of a typical gyro readout can be found in "The Laser Gyro", by F. Aronowitz, Laser Applications, Vol. 1, Academic Press, 1971, pp. 139–141.

In the construction of the corner reflector 12, typically a block or substrate 12B of optic material is provided onto which the partially reflective face 12A and beamsplitter face 26 are coated. In addition, as shown in the side view of the reflector element 12, denoted in FIG. 1 as 12S, the substrate 12 is shaped with a wedge configuration, as shown in cross section, whereby the partially reflective faces 12A and 26 are not parallel, but are displaced from a parallel position by a very small angle, $\alpha$. The angle, $\alpha$, which is on the order of, for example, thirty arc-seconds, determines the angle, $\beta$, between the respective beams 15C and 15CC onto the detector 25. By controlling the magnitude of the angle, $\alpha$, the separation of the interference fringes can be controlled, as is known in the art.

As shown in FIG. 2, the detector 25 includes a plurality of strips of detector material 33 placed on a substrate 34, and oriented generally in the direction of the stripes 36 produced by the interference pattern between the clockwise and counter clockwise rotating beams 15C and 15CC. The rate of movement of the stripes 36 across the detectors 33 is indicative of the frequency difference between the clockwise and counter clockwise rotating beams 15C and 15CC about an axis of rotational sensitivity, denoted by the outwardly pointing arrow 40 in FIG. 1. With the detector spacing approximately equal to one-fourth of the fringe spacing, it is possible to determine whether the fringes are moving up or down by techniques known in the art. The direction of fringe motion depends, of course, upon whether rotational input is clockwise or counterclockwise.

With respect to the prior art embodiment of the ring laser gyroscope of FIG. 1, it should be noted that two separate outputs are derived, an intensity output derived from the partially reflective element 13 at one corner, and a frequency difference indicating output derived at the partially reflective element 12 at another corner.

With respect to general design principles in ring laser gyroscopes, one important objective is to minimize the losses within the laser cavity or counter rotating beam path. Thus, ideally, partially reflective mirror surfaces should be avoided, if possible, because of their inherent losses. In addition, the substrates on which partially reflective coatings are deposited may be backed by special structures, such as piezoelectric assemblies, which makes the sampling of the output beams inconvenient, or, in some cases, impossible.

SUMMARY OF THE INVENTION

In light of the above, it is, therefore, an object of the invention to provide an improved ring laser gyroscope structure.

It is another object to provide a ring laser gyroscope structure of the type described which reduces the requirements imposed upon the partially reflective output mirror surfaces required in the prior art.

It is still another object of the invention to provide a ring laser gyroscope which derives all of its output signals at a single corner reflector.

It is yet another object of the invention to provide an improved detector structure for use in a ring laser gyroscope.

It is another object of the invention to provide an improved detector structure which can be used at a single corner or reflector surface of a counter rotating beam path of a ring laser gyroscope.

It is another object of the invention to provide a single detector array which produces outputs indicative both of individual intensities of the counter rotating light beams of a ring laser gyroscope and the frequency difference between them.

These and other objects, features and advantages will become apparent to those skilled in the art from the following detailed description when read in conjunction with the accompanying drawings and appended claims.

The invention, in its broad aspect, presents a ring laser gyroscope which includes a laser ring having at least three reflective surfaces. Means are provided for removing a portion of the laser light within the ring, and for directing the removed light onto an output detector. Means are provided for displacing the light directed on the output detector in a fashion by which a portion of the light from one of the counter rotating beams only partially overlaps the light from the other beam. A detector is provided for detecting the intensity of each of the counter rotating beams from the nonoverlapping beam portions on the detector and for detecting the fringe motion of the interfering beams produced by the overlapping portions of the beams on the detector.

In another aspect of the invention, a detector is provided for detecting the counter rotating beams and intensity and frequency differences, as aforesaid, in which two intensity producing detectors are provided spaced apart by distance corresponding approximately to the overlapping portions of the counter rotating light beams upon the detector, whereby the overlapping portions of the beams fall generally between the two detectors. A plurality of detector stripes are provided between the two intensity detectors, whereby stripes of the interference patterns move across the detector stripes to provide an indication of the frequency difference between the counter rotating beams.

BRIEF DESCRIPTION OF THE DRAWING

The invention is illustrated in the accompanying drawing in which:

FIGS. 5a and 5b are plan views of a preferred embodiment of a detector for detecting the output from the ring laser gyroscope fabricated in accordance with the invention, such as that illustrated in FIG. 3.

And FIG. 6 is a plan view of an alternative embodiment of a corner reflector apparatus for generating an output from a ring laser gyroscope, in accordance with the principles of the present invention.

In the various figures of the drawing, the sizes and dimensions of various parts have been exaggerated or distorted for clarity of illustration and ease of description. Also in the various figures of the drawing, like reference numerals are used to denote like or similar parts.

DETAILED DESCRIPTION OF THE PREFERRED EMBODIMENTS

Figure 3:
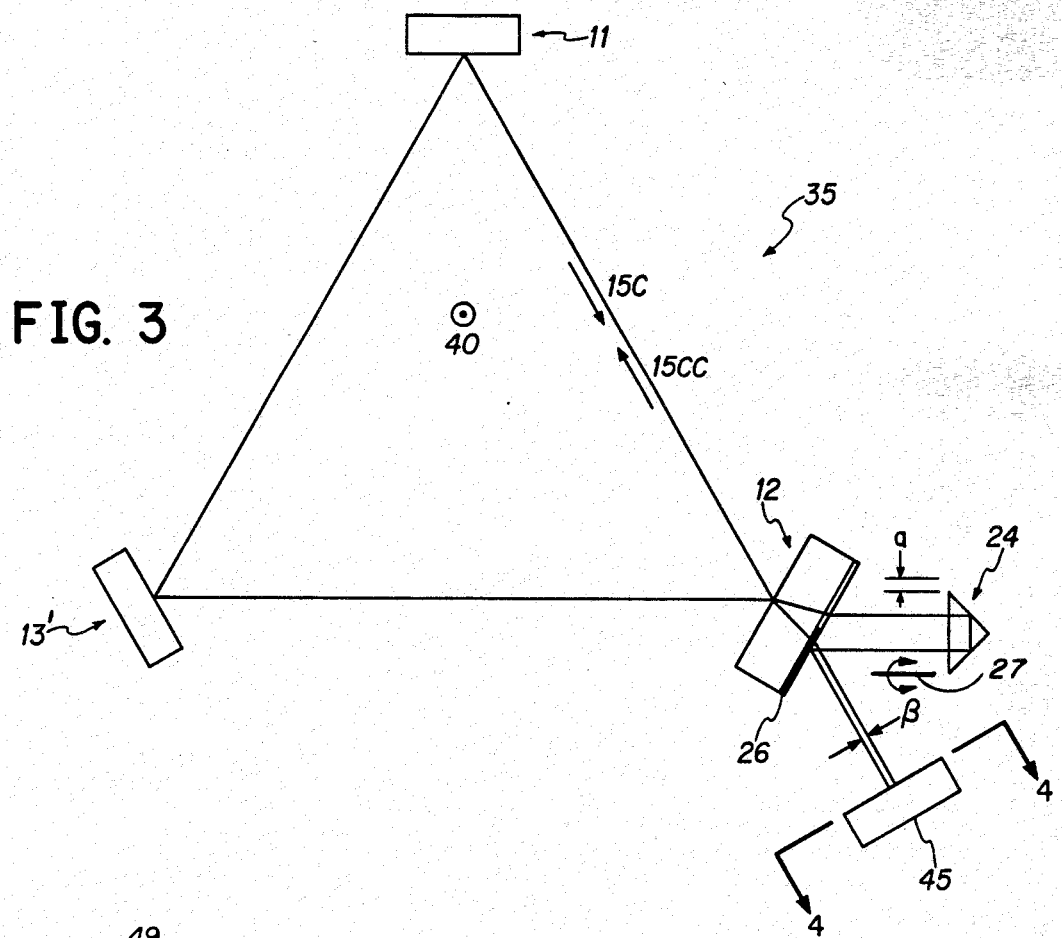
FIG. 3 represents one embodiment of a ring laser gyroscope fabricated in accordance with the principles of the present invention.

A ring laser gyroscope 35 in accordance with a preferred embodiment of the invention is shown in FIG. 3, and is fabricated essentially similarly to that above described with respect to the embodiment 10 shown in FIG. 1, except as described below. The ring laser gyroscope 35 includes at reflective surface 13' a mirrored surface which is not partially reflective and transmissive, and is as perfectly reflective as possible.

Figure 1:
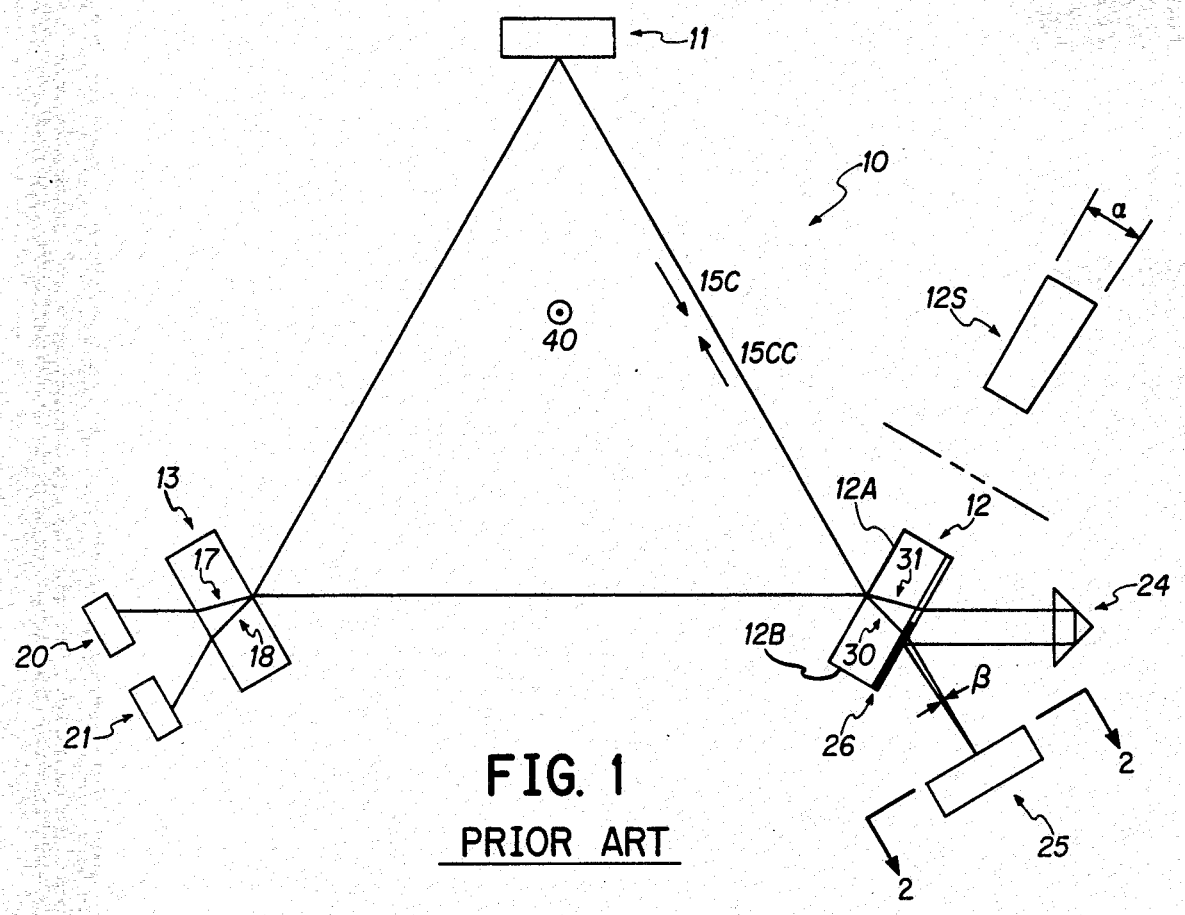
FIG. 1 represents a ring laser gyroscope in accordance with the prior art.
Figure 2:
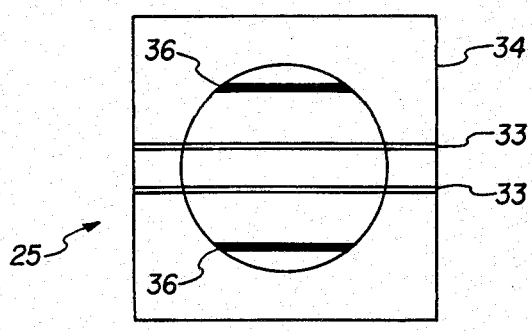
FIG. 2 is a view taken at 2—2 of FIG. 1 showing a typical fringe pattern developed in the operation of a ring laser gyroscope fabricated in accordance with the ring laser gyroscope embodiment of FIG. 1.

The reflector element 12 is fabricated in a fashion similar to that described with respect to the reflector element 12 of FIG. 1. The corner reflector 24, however, unlike that of the embodiment of FIG. 1, is offset either angularly about the axis 27, or linearly, as denoted by the letter "a" above the corner reflector 24, as shown in the FIG. 3 embodiment. The purpose for the angular on linear displacement of the corner reflector 24 is to offset the position of the beams as they impinge the detector 45 to produce the offset, partially overlapping beam pattern, presently described. Thus, the pattern of the counter clockwise beam 15CC as it impinges the detector 45 only partially overlaps the pattern of the clockwise beam 15C as it impinges the detector 45. With the beams thus offset, therefore, the pattern shown in FIG.

4a will result from an angular displacement of the corner reflector 24 about the axis 27. Similarly, the pattern shown in FIG. 4b will result if the corner reflector 24 is linearly moved in the direction of the displacement "a". (The reference position for both conditions is that location of the corner reflector 24 which produces perfectly overlapping beam patterns. It should be noted that the angle, $\alpha$, exists in the same fashion as that described with reference to FIG. 1 above.

Figure 4A:
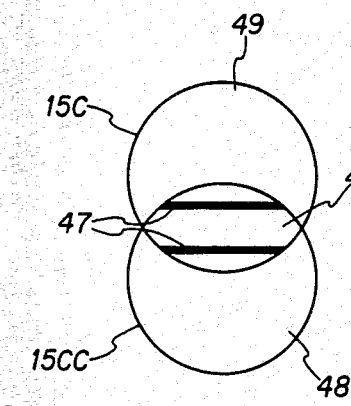
FIGS. 4a and 4b are views of the output light patterns derived from the ring laser gyroscope embodiment of FIG. 3, taken at 4—4 in FIG. 3, and FIGS. 4c and 4d are views of output patterns consistent with the ring laser gyroscope embodiment of FIG. 6, taken at 4—4.
Figure 4C:
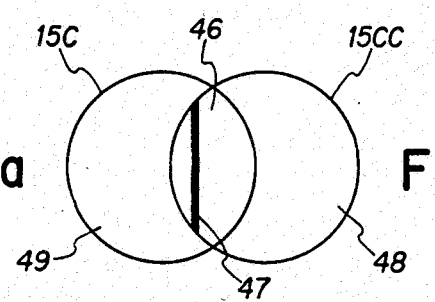
Figure 4B:
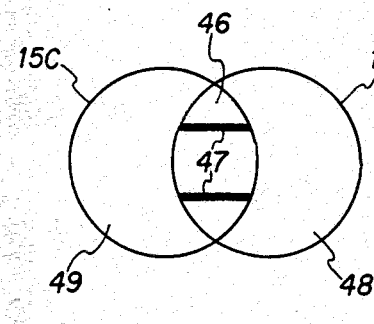

More specifically, as shown in FIGS. 4a and 4b, output patterns are derived from the circuit of FIG. 3, below described, depending on the orientation of the parts which produces the particular beam offset pattern. In one case, shown in FIG. 4b, the patterns of the beams on the detector 45 are shown displaced side by side, and are denoted by the reference numerals 15C and 15CC. The patterns are partially overlapping to form an area 46 in which interference fringes or patterns 47 are formed. In addition, nonoverlapping areas 48 and 49 are formed in which essentially no interference fringes are produced. Similarly, if the parts are arranged so that the beam patterns are displaced one above the other, the pattern shown in FIG. 4a will result. The beams patterns are numbered similarly to that shown in FIG. 4b.

In like fashion, if the parts are arranged in a fashion in which vertical interference fringes are produced, as shown, for instance, in the embodiment of FIG. 6 below described, the horizontal and vertically displaced beam patterns shown, respectively, in FIGS. 4c and 4d will result.

With the beam patterns thus formed, a detector described below with reference to FIGS. 5a and 5b can be employed to produce the output from the gyroscope. If the beam patterns produced are similar to those produced with respect to FIGS. 4b or 4d above described, the detector of FIG. 5b can be used. The detector of FIG. 5b includes a pair of detectors 50 and 51 of parallelogram shape which can be provided spaced apart as shown. The overlapping portion 46 of the beams is configured to fall within the inner space 52 between the detectors 50 and 51. Thus, the portion of the nonoverlapping beam 15C which falls upon the detector 50 produces in the detector an output signal indicative of the intensity of the beam 15C. In like fashion, the nonoverlapping portion of the beam 15CC which falls upon the detector 51 produces a signal in the detector 51 which is indicative of the intensity of the beam 15CC.

Spaced within the space 52 between the two intensity detectors 50 and 51 are stripe detectors 66 and 67, with the spacing between the centers of the detectors 66 and 67 being approximately one quarter of the fringe spacing. The overall detector patterns can be conveniently emplaced on a detector substrate or base 65 for ease in handling. Alternatively, the stripe pattern can be achieved by appropriate masking techniques, as is known in the art.

If the beam patterns of FIGS. 4a or 4c are produced, the detector shown in FIG. 5a can be used. In the embodiment shown in FIG. 5a the stripe detectors 60 and 61 are vertically oriented. Thus, the overlapping portions 46 of the beams 15C and 15CC between the detectors 50 and 51 produce the interference fringes 47 which sweep across the stripes 60 and 61 at a rate which depends upon the frequency difference between the respective counter rotating beams 15C and 15CC. With the spacing of the detector elements 60 and 61 being about one-fourth the fringe spacing, the phase relationship between signals taken from detectors 60 and 61 can be used to indicate the sense of rotational input. The outputs from the detectors 60 and 61 can therefore be processed in usual fashion.

It should be appreciated that the detectors 50 and 51 can be constructed of a single detector element, as shown, or, alternatively, can be formed of a number of smaller individual detector elements (not shown) disposed generally within the nonoverlapping beam impinging areas with their respective outputs combined to produce the desired single beam intensity related signal. It should be noted that the elements shown on the detectors of FIGS. 5a and 5b are electrically isolated from each other.

It should also be noted that generally the beam patterns practically achievable are not circular but are somewhat elliptical due to the use of spherical mirrors with non-normal angles of incidence within the beam path of the gyroscope. In such instances, however, the beam intensity typically falls off in a Gaussian manner from the peak value, and the detectors above described can be equally advantageously employed.

With respect to the selection of the amount of overlap with which the invention can be practiced, it is believed that the area of overlap should probably exceed the areas of nonovelap to achieve the best detection sensitivity. Depending upon the particular application, the amount of overlap can be empirically determined.

With the detectors constructed as outlined and described with respect to FIGS. 5a and 5b, the necessity for having the output from the detector at two separate corners, as was the case in the prior art as described above with reference to FIG. 1, has been eliminated. Thus, the intensities of the respective counter rotating beams 15C and 15CC can be determined by the detectors 50 and 51 onto which the nonoverlapping portions of the respective beams fall. In addition, the movement of the interference fringes 47 of the two beams in the overlapping portions thereof can be easily determined as they sweep across the detector stripes 60 and 61 (in the embodiment of FIG. 5a) or 66 and 67 (in the embodiment of FIG. 5b). It should be noted that the detector configurations of FIGS. 5a and 5b can be equally advantageously employed with respect to the vertically oriented beam displacement configurations above described with respect to FIGS. 4a and 4d, by merely rotating the detectors 5a and 5b respectively by 90 degrees.

It will be appreciated that other methods and apparatuses for producing the displaced beam patterns described can be used, other than that described with reference to FIG. 3. For example, another configuration of parts which will result in the beam displacement is shown in FIG. 6. The embodiment in FIG. 6 is intended to be included at one of the corners, such as the lower right hand corner of FIG. 3 in place of the partially reflective mirror element 12, the reflecting wedge 24, and the detector 25, and includes a partially reflective surface 70 formed on a optically transmissive substrate or base 72. A 50-50 beamsplitting coating 73 is deposited on a prism 75 over the area through which beam 15CC passes. In the embodiment of FIG. 6, the substrate 72 is configured so that the front and back surfaces 71 and 74 are essentially parallel.

A combining prism 75 is provided adjacent to the back surface 74 of the substrate 72. The combining prism 75, however, is wedge shaped, the angle 76 at the base thereof being slightly different from 90 degrees by an amount, $\gamma$, depending on the fringe spacing desired when the beams are combined. Deviation of the corner angle from 90 degrees by γ causes the angle between the beams of ψ as they leave part 75 for detector 65. The amount of overlap between beams 15C and 15CC at the detector 65 is controlled by the positioning of the prism 75 on the substrate 72. It will be appreciated that translation of the prism 75 along axis I adjusts the separation of the beams in the plane of the paper. On the other hand, rotation of the prism about axis II, which is perpendicular to the substrate 72, adjusts the separation of the beams perpendicular to the plane of the paper. (In contrast, in the prior art, adjustments were made to obtain complete overlap as discussed with regard to FIG. 1.)

Figure 4D:
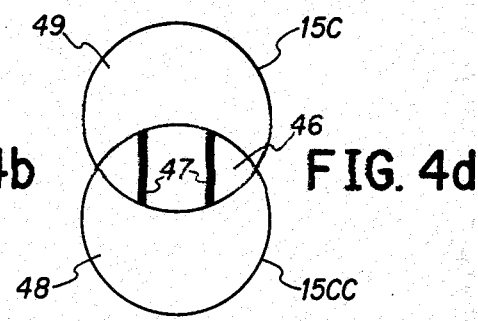

For the embodiment of the invention illustrated, a small translation along axis I will yield the FIG. 4c pattern, while a small rotation about axis II will yield the FIG. 4d pattern.

It should be noted that although the ring laser gyroscope has been described and illustrated with respect to a three mirrored or triangular shaped ring, other configurations such as rectangular, pentagonal, and so forth can be also used in accordance with the principles of the invention.

Although the invention has been described and illustrated with a certain degree of particularity, it is understood that the present disclosure has been made by way of example, and that numerous changes in the combination and arrangement of parts may be resorted to by those having ordinary skill in the art without departing from the spirit and the scope of the invention as hereinafter claimed.

I claim:

1. A ring laser gyroscope comprising:
    a laser ring having counter rotating light beams which have a frequency difference relatable to the rate of rotation of said ring about an axis of rotational sensitivity,
    means for removing a portion of the counter rotating light beams from the ring,
    means for displacing the removed counter rotating beams whereby a portion of the light of the removed beams overlaps and a portion of each of the beams does not overlap,
    means for receiving said displaced beams including means for detecting each non-overlapping beam portion and means for detecting fringe motion of said overlapping beams.

2. The ring laser gyroscope of claim 1 wherein said detector comprises:
    a pair of spaced detectors at least partially aligned with said non-overlapping beams, and
    a number of detector stripes between the pair of detectors for detecting the fringe movement within the area of beam overlap.

3. The ring laser gyroscope of claim 2 wherein the stripes are horizontally oriented.

4. The ring laser gyroscope of claim 2 wherein the stripes are vertically oriented.

5. The ring laser gyroscope of claim 2 wherein each of said pair of detectors comprises a plurality of smaller detectors each arranged generally within the non-overlapping area of a respective one of said beams.

6. The ring laser gyroscope of claim 1 wherein said means for removing a portion of said counter rotating beams is a partially reflecting and partially transmitting mirror.

7. The ring laser gyroscope of claim 6 further comprising optical means associated with said mirror reflective surfaces comprising a corner reflector for producing said beam displacement.

8. A ring laser gyroscope comprising:
    a laser ring having counter rotating light beams which have a frequency difference relatable to the rate of rotation of said ring about an axis of rotational sensitivity,
    a reflector means at one corner of said ring which partially transmits and partially reflects said light within said ring to remove a portion of the light of each of said beams from said ring,
    means for receiving said removed beams, onto which said removed beams are directed,
    means for displacing the removed beams whereby a portion of the light of each beam partially overlaps the other,
    detector means on said receiving means comprising:
    first and second intensity detectors respectively aligned whereby non-overlapping portions of each of said removed beams falls respectively on each of said intensity detectors,
    and at least two detectors aligned whereby said overlapping portions of said removed beams falls at least partially thereupon, whereby movement of the interference patterns over said at least two detectors produces a signal indicative of the frequency difference of said removed beams and sense of rotational input.

9. The ring laser gyroscope of claim 8 wherein said at least two interference pattern detectors comprise at least two stripes aligned between said first and second intensity detectors.

10. The ring laser gyroscope of claim 9 wherein said at least two interference pattern detectors are two in number.

11. The ring laser gyroscope of claim 9 wherein said at least two interference pattern detectors are vertically oriented with respect to said intensity detectors.

12. The ring laser gyroscope of claim 9 wherein said at least two interference pattern detectors are horizontally oriented with respect to said intensity detectors.

13. The ring laser gyroscope of claim 8 wherein each of said first and second intensity detectors comprises a plurality of smaller detectors each arranged generally within the non-overlapping area of a respective one of said beams.

14. The ring laser gyroscope of claim 9 further comprising optical means associated with said mirror reflective surfaces comprising a corner reflector for producing said beam displacement.

15. The ring laser gyroscope of claim 14 wherein said corner reflector comprises a wedge displaced an amount to produce said displacement of said removed beams.

16. The ring laser gyroscope of claim 15 wherein said displacement is linear displacement.

17. The ring laser gyroscope of claim 15 wherein said displacement is angular displacement.

18. The ring laser gyroscope of claim 14 wherein said corner reflector comprises a beamsplitting coating on said partially reflector means, and a wedge adjacent the partially reflective mirror, the angle of a corner of said wedge upon which one of said removed beams impinges being such that it reflects said incident beam an amount to impinge on said beamsplitting coating to be reflected therefrom at an angle different from the other beam, thereby producing a desired fringe spacing.

* * * * *